(12) United States Patent    (10) Patent No.:     US 8,826,873 B2
Landersdorfer et al.          (45) Date of Patent:    Sep. 9, 2014

(54) ROTOR FOR A CAMSHAFT ADJUSTER, AND CAMSHAFT ADJUSTING SYSTEM

(75) Inventors: Ulrich Landersdorfer, Moosburg (DE); Armin Braun, Buttenheim (DE)

(73) Assignees: Schaeffler Technologies AG & Co. KG, Herzogenaurach (DE); Bayerische Motoren Werke AG, Munich (DE)

( * ) Notice: Subject to any disclaimer, the term of this patent is extended or adjusted under 35 U.S.C. 154(b) by 0 days.

(21) Appl. No.: 13/816,751

(22) PCT Filed: Sep. 15, 2011

(86) PCT No.: PCT/EP2011/004632
§ 371 (c)(1),
(2), (4) Date: Mar. 20, 2013

(87) PCT Pub. No.: WO2012/038048
PCT Pub. Date: Mar. 29, 2012

(65) Prior Publication Data
US 2013/0213331 A1    Aug. 22, 2013

(30) Foreign Application Priority Data

Sep. 25, 2010 (DE) .......................... 10 2010 046 619

(51) Int. Cl.
| F01L 1/34 | (2006.01) |
| F01L 1/053 | (2006.01) |
| F01L 1/344 | (2006.01) |
| F16D 1/08 | (2006.01) |

(52) U.S. Cl.
CPC ................. *F01L 1/344* (2013.01); *F01L 1/053* (2013.01); *F01L 1/3442* (2013.01); *F16D 1/0876* (2013.01)
USPC ..................... 123/90.17; 123/90.15

(58) Field of Classification Search
USPC ................................. 123/90.15, 90.17, 90.31
See application file for complete search history.

(56) References Cited

U.S. PATENT DOCUMENTS 6,820,578 B2 * 11/2004 Kanada et al. ............. 123/90.15
2003/0165354 A1   9/2003 Matt
2004/0244745 A1  12/2004 Palesch et al.

FOREIGN PATENT DOCUMENTS

DE    102004019190 A1   11/2005
DE    102008050134 A1    4/2010

(Continued)

OTHER PUBLICATIONS

English Translation of the International Search Report and Written Opinion for International Application No. PCT/EP2011/004632 dated Apr. 4, 2013.

(Continued)

*Primary Examiner* — Zelalem Eshete
(74) *Attorney, Agent, or Firm* — Mendelsohn, Drucker & Dunleavy, P.C.; Steve Medelsohn

(57) ABSTRACT

The invention relates to a rotor (1, 71) for a camshaft adjuster, comprising a substantially annular rotor basic body (3, 73) which has an end surface (11, 91) with a contour (15, 89) which extends in an axial direction, wherein the contour (15, 89) has an asymmetry such that precisely one position is predefined for the axial attachment of the rotor basic body (3, 73) to a camshaft (31, 112). A rotor (1, 71) with a contour (15, 89) of this type makes centering on a camshaft (31, 112) possible in a manner which is cost-neutral and can be easily implemented in terms of manufacturing technology. Furthermore, the invention relates to a camshaft adjusting system (111) with an above-mentioned rotor (1, 71).

13 Claims, 5 Drawing Sheets

(56) References Cited

FOREIGN PATENT DOCUMENTS

| | | | |
|---|---|---|---|
| JP | 9280020 | A | 10/1997 |
| WO | WO2010006855 | A1 | 1/2010 |

OTHER PUBLICATIONS

International Search Report mailed Nov. 24, 2011 for corresponding PCT Application No. PCT/EP2011/004632.

* cited by examiner

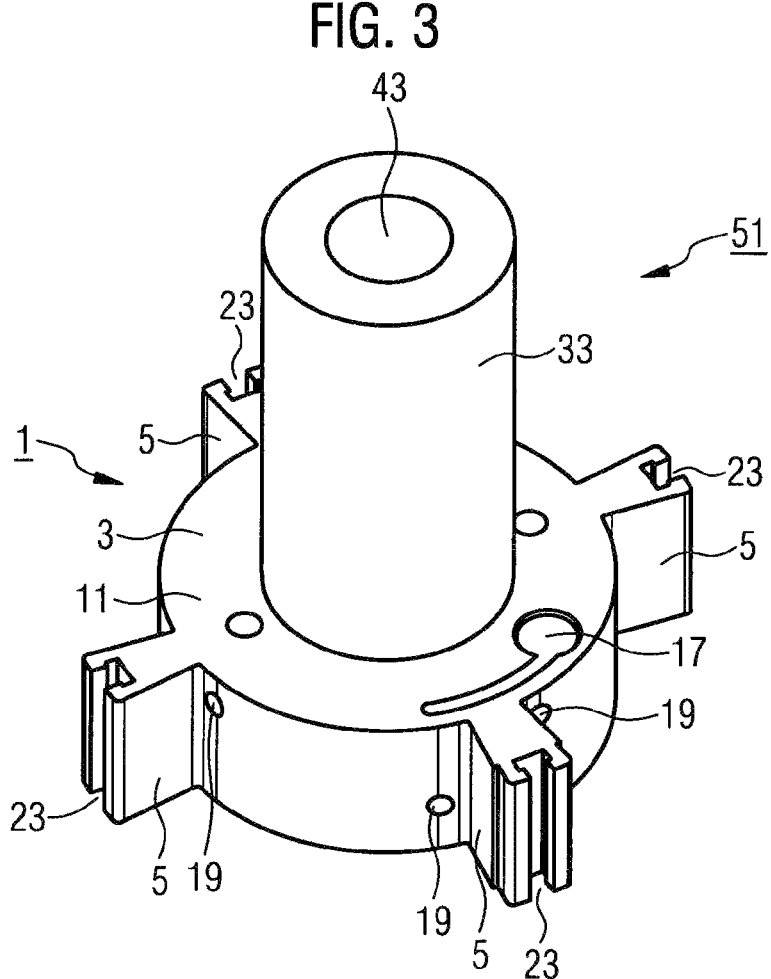
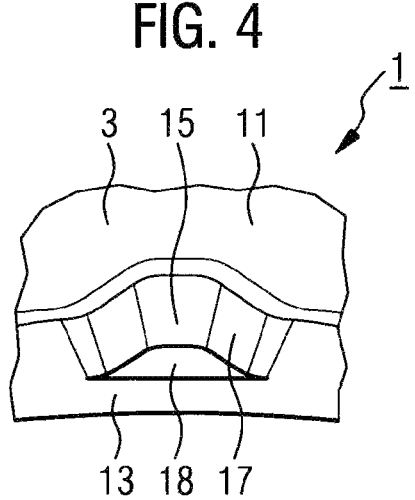

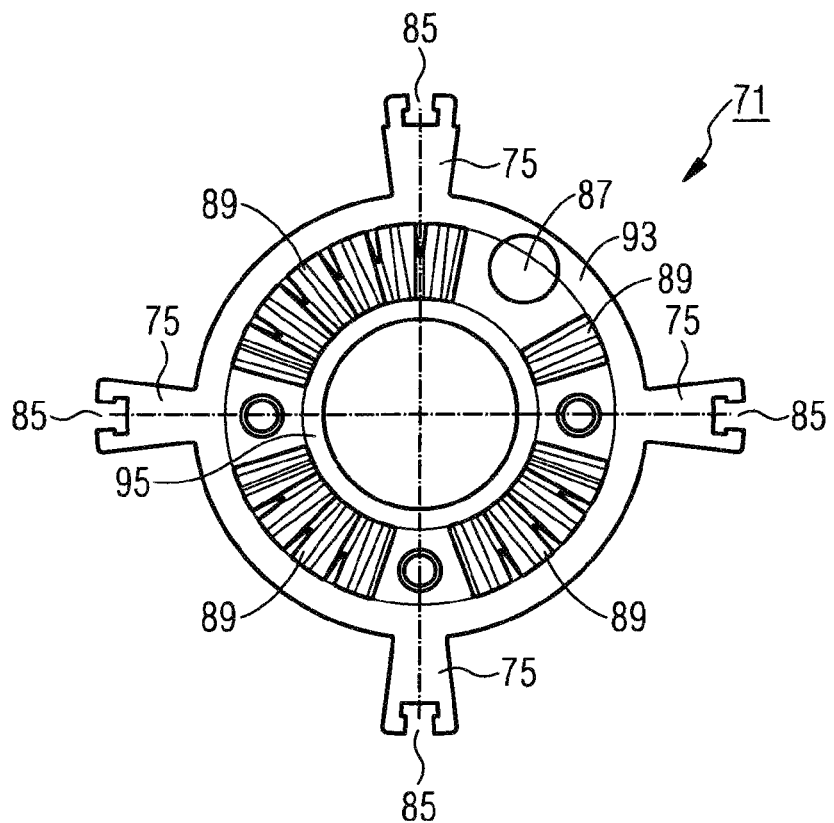
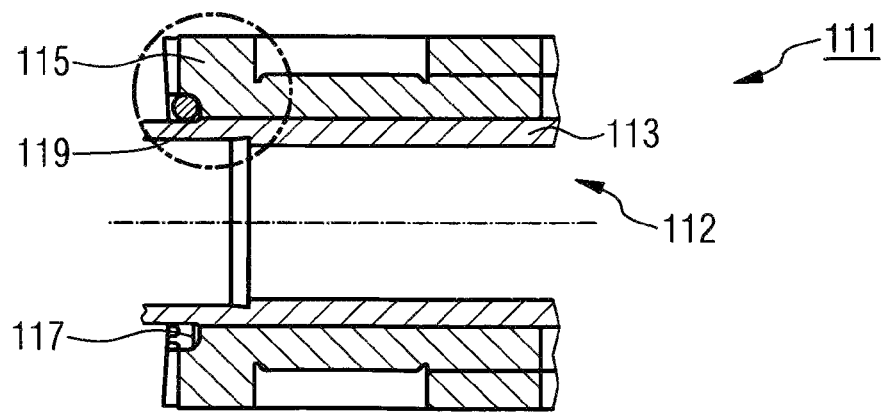

ROTOR FOR A CAMSHAFT ADJUSTER, AND CAMSHAFT ADJUSTING SYSTEM

FIELD OF THE INVENTION

The invention relates to a rotor for a camshaft adjuster, having a substantially annular rotor main body which has an end surface for axial connection to a camshaft. The invention also relates to a camshaft adjusting system having a rotor of said type.

BACKGROUND OF THE INVENTION

A rotor serves, as part of a camshaft adjusting system, for the targeted adjustment of the phase relationship between a camshaft and a crankshaft in an internal combustion engine. For this purpose, the rotor is conventionally held in a stator which is connected rotationally conjointly to the crankshaft. Such a rotationally conjoint connection is a prerequisite for failure-free functioning of a camshaft adjuster.

To ensure such a reliable connection between a camshaft adjuster and a camshaft, a play-free connection of the rotor to the camshaft is necessary. The reliable transmission of the torque of the crankshaft to the camshaft can be ensured in this way. The connection may be realized for example by means of a central screw which fixes the rotor and the camshaft to one another in a non-positively locking manner. The forces and torques transmitted here arise substantially from the friction between the interconnected surfaces of the components. To increase said friction, friction disks may additionally be inserted between the respective contact surfaces.

Here, the screw connection must exhibit very high preload forces in order to ensure that the torque to be transmitted from the crankshaft is introduced into the camshaft in a reliable manner and without play. This necessitates for example an increased material thickness of the components. Furthermore, if additional friction disks are used, the risk of possible multiple installation must be taken into consideration.

SUMMARY OF THE INVENTION

In certain embodiments of the invention, a rotor is improved in relation to the prior art, which rotor provides a facility, which is neutral in terms of cost and easily implementable from a manufacturing aspect, for centering on a camshaft.

In other embodiments of the invention, a camshaft adjusting system has a rotor as specified above.

According to certain embodiments, the invention is achieved by means of a rotor for a camshaft adjuster, having a substantially annular rotor main body which has an end surface with a contour, which extends in an axial direction, for axial connection to a camshaft. It is provided here that the contour is asymmetrical such that exactly one position for the axial connection of the rotor main body to a camshaft is predefined.

The invention, in certain embodiments, takes into consideration that a secure connection of a rotor or of a camshaft adjuster to a camshaft ensures failure-free functioning of a camshaft adjusting system. The torques of the crankshaft are introduced into the camshaft in a reliable manner and without play. The possibilities available for this purpose, such as for example a preloaded screw connection or the use of friction-increasing disks, duly permit the desired reliable transmission of torque between the components, but such a fastening is often not implementable for assembly and manufacturing reasons.

Taking this into consideration, the invention, in certain embodiments, recognizes that a fastening of the rotor and of the camshaft to one another can likewise be realized if contours are formed on the rotor and on the camshaft, which contours can engage into one another in a positively locking manner in order to position the components. In this way, the transmission of torque of the crankshaft to the camshaft can likewise be realized by means of positive locking between the components. In each case one defined assembly position of the rotor or of the camshaft adjuster on the camshaft is provided, which permits fastening of the rotor to the camshaft in the correct position and ensures that the rotor is oriented on the camshaft accurately in terms of angle relative to the cams.

In the case of the hitherto known fastening possibilities, however, different assembly positions are basically possible, such that cumbersome inspection with regard to correct positioning is necessary.

In this regard, the invention, in certain embodiments, recognizes finally that said problem can be eliminated if a rotor is used which can be fastened to a camshaft in one intended assembly position. This is made possible by means of a rotor which, on the end surface of the main body thereof, has an axially extending contour which is formed asymmetrically on the end surface such that exactly one position for the axial connection of the rotor main body to a camshaft is predefined. Said design of the contour constitutes a facility for a self-centering and torque-transmitting connection of a rotor to a camshaft.

Here, the asymmetrical design of the contour permits the connection of the rotor to a camshaft with corresponding counterpart contour in one defined assembly position of the rotor on the camshaft, such that incorrect assembly of the rotor is not possible. The rotor can be orientated accurately in terms of angle relative to the cams of the camshaft without ancillary elements. Reliable functioning of the camshaft adjuster can be ensured in this way, such that a play-free and reliable transmission of the torques from the crankshaft to the camshaft is ensured. The operational reliability of a camshaft adjuster is thus ensured. Furthermore, owing to the predefined assembly position, it is possible to dispense with an expensive and time-consuming check of the correct positioning of the rotor and thus the check of the engine timing.

The contour is formed for example on the end surface and may take different forms. The contour extends in an axial direction and may be of correspondingly raised form, for example with teeth, studs or elevations, or in particular in the form of depressions or material cutouts in the end surface. The contour may in particular be formed in the rotor main body in one step simultaneously with the production of said rotor main body. This is possible for example in the case of a powder metallurgy production process such as a sintering process.

Furthermore, the contour may also take different forms with regard to its desired asymmetry. It may for example take the form of a single depression or elevation in the end surface of the rotor main body or else may be composed of a plurality of individual depressions and/or elevations distributed over the circumference. In the case of a contour with a plurality of depressions, these are in particular not distributed rotationally symmetrically over the end surface of the rotor main body but are rather formed such that the distribution of the contour or of the depressions and/or elevations of the contour permits only one possible position of the rotor on the camshaft. The rotor is hereby fixed in a rotationally conjoint manner to the camshaft.

Furthermore, the contour may extend to different extents in an axial direction. Here, the axial length of the contour may in particular be coordinated with the dimensions of a corresponding counterpart contour.

The rotor itself is formed with a substantially circular main body on which rotor vanes are arranged. The number of rotor vanes is variable as a function of the adjustment angle to be set. It is basically the case here that the more rotor vanes are arranged on a rotor main body, the smaller is the adjustment angle that can be set. The rotor vanes may be attached as separate components to the rotor main body, or may preferably be produced in one piece therewith, in particular in a sintering process, such that only one process step is required for the manufacture of the rotor. The rotor vanes extend in a radial direction such that, in the installed state, they abut with their vane ends against the inner circumference, or against the inner lateral surface, of a stator. The vane ends extend in a circumferential direction preferably with an outer radius which corresponds to the inner radius of the stator, such that for example jamming of the vane ends against the inner lateral surface of the stator during operation is avoided.

In one advantageous embodiment of the invention, the contour is formed with a number of individual depressions which are distributed asymmetrically at varying angular intervals over the inner circumference of the rotor main body. Here, the individual depressions are formed on the inner circumference so as to be in each case individually spaced apart from one another. The spacing between the depressions can be variably selected and is coordinated with a counterpart contour of a camshaft. The depressions may extend radially outward in the end surface, wherein said depressions may extend into the end surface to different extents depending on the embodiment and the field of use. The depressions may furthermore extend in the rotor to different extents in the axial direction.

In a further advantageous embodiment of the invention, the contour is formed with a number of individual depressions which are embedded asymmetrically at varying angular intervals in the end surface of the rotor main body. As a result of the varying angular intervals, an asymmetrical, that is to say rotationally non-symmetrical distribution of the depressions over the circumference of the end surface is provided, whereby only one assembly position for the rotor on the camshaft is available. The embedding of the contour or of the depressions of the contour in the end surface, which is preferably realized at both sides in the radial direction, furthermore ensures adequate stability for engagement into a counterpart contour. The individual depressions may likewise, as already explained above, extend into the rotor main body to different extents.

The depressions preferably have contact surfaces which taper obliquely with respect to the radial and/or the axial direction. The contact surfaces serve for the abutment of the contact surfaces of the counterpart contour of a camshaft in the assembled state. Here, the degree of the inclination of the contact surfaces may vary both in the axial direction and also in the radial direction. Overall, the oblique design of the contact surfaces permits self-centering of the rotor on the camshaft and a transmission of torque between a crankshaft and a camshaft by means of the positively locking engagement of the counterpart contour into the contour. Said transmission of torque permits the transmission of large forces and torques with high efficiency and a relatively low preload force.

In the end surface of the rotor main body there is expediently formed at least one annular surface, which encircles the contour, for the sealing of the camshaft adjuster. Basically any embodiment of the end surface may, regardless of the shape of the contour, comprise an annular surface. Here, annular surfaces are generated in particular by the embedding of the contour in the end surface between the outer diameter of the rotor main body and the inner diameter of said rotor main body. The annular surfaces can be used for providing sealing against external leakage of hydraulic fluid from the camshaft adjuster. The annular surfaces may be of planar form or else may be formed as grooves into which sealing elements, for example, may be inserted. By means of this embodiment, in the installed state, sealing against leakage can be provided between the end surface of the rotor and the abutment surface of a camshaft or of the camshaft adjuster.

In a further advantageous embodiment of the invention, the contour is formed with a number of individual depressions in the manner of a discontinuous Hirth toothing. The Hirth toothing is an axially acting spur toothing by means of which a high-strength connection of components to one another can be realized. The connection is formed by positive locking between the intermeshing teeth of two components. The teeth of the components to be connected are normally of conical form and bear statically and areally against one another in the manner of a non-positively locking coupling. The teeth are arranged radially and center the components to be connected. It is thus possible in particular for high torques to be transmitted in a wear-resistant manner and additionally for high operational reliability to be ensured. In the present case, said toothing permits centering of the rotor on the camshaft and thus fixing in the axial position thereof. By means of the discontinuous form, that is to say the omission of depressions, or by means of different tooth pitches, incorrect assembly of the rotor on the camshaft can likewise be ruled out. The operational reliability of the camshaft adjuster and of the camshaft adjusting system can correspondingly be ensured.

The invention, in other embodiments, is achieved by means of a camshaft adjusting system for an internal combustion engine, comprising a rotor according to one of the preceding embodiments, and comprising a camshaft. Here, the camshaft has, on its end side, a counterpart contour by means of which the contour of the rotor is connected in a positively locking manner to the camshaft. The positively locking connection can transmit particularly high forces and can be disassembled relatively easily for example during disassembly or in the event of any necessary exchange of the rotor.

As already described further above, a camshaft adjusting system of said type permits a positively locking fastening of the camshaft and rotor to one another in a predefined position. As a result of the asymmetrical form of the contour both in the end surface of the rotor main body and also in the corresponding counterpart contour on the camshaft, incorrect assembly of the rotor or of the camshaft adjuster is not possible. Owing to the reliable fastening, the rotor is positioned axially on the camshaft and thus permits a play-free and reliable transmission of the torques from the crankshaft to the camshaft.

In an internal combustion engine having in each case one camshaft adjusting system for inlet and outlet cams, it is particularly advantageously the case that the positive locking configuration selected for the inlet adjuster differs from that selected for the outlet adjuster, such that an erroneous interchange of the adjusters during assembly cannot occur. For example, the tooth form, the number or the position of the teeth, or the diameters may differ.

The counterpart contour of the camshaft is preferably formed on an end side of the camshaft. Said counterpart contour is formed so as to be suitable for fastening to the contour of the rotor. For example, in the case of a contour which is formed with individual depressions, the counterpart contour is of correspondingly raised form. Alternatively, the reverse variant, in which the contour of the rotor is formed for example in the manner of studs which engage into the counterpart contour of a camshaft, is basically also possible.

The rotor is part of a camshaft adjuster which likewise comprises a stator, which in turn is connected rotationally conjointly to the crankshaft. The rotor is held in the stator. For this purpose, the stator normally has a number of radially inwardly extending webs, between which pressure chambers are formed. The radially outwardly extending vanes of the rotor can be positioned in the pressure chambers such that the hydraulic regions for charging with a hydraulic medium are formed in each case at the outer sides of the vanes.

Aside from a stator and a rotor, the camshaft adjuster is normally also formed with a sealing cover and with a locking cover. The locking cover is preferably connected to the stator and delimits the pressure chambers at the camshaft side. Said locking cover serves for sealing off the pressure chamber to the outside and in this way prevents a controlled escape of hydraulic medium. In this way, the external leakage of a camshaft adjuster is also reduced. In the locking cover there is normally formed a slotted guide which serves for the engagement of a locking piston and thus for fixedly positioning the stator and rotor in an anticipated position.

In one advantageous embodiment of the invention, the counterpart contour of the camshaft has a number of axially extending individual elevations which engage into the depressions of the rotor. The elevations on the circumference of the camshaft are spaced apart by the same intervals as the depressions in the end surface of the rotor. It can be ensured in this way that the rotor is fastened in a predetermined position on the exact camshaft provided for it.

In a further advantageous embodiment of the invention, a sealing element is positioned in the annular surface which encircles the contour, which sealing element provides sealing with respect to the camshaft. Said sealing reduces the external leakage of the camshaft adjuster, and thus prevents hydraulic medium from escaping to the outside from the space between the rotor vanes. The reliable functioning of a camshaft adjuster can be ensured in this way.

An adapter ring is expediently provided, via which the contour of the rotor is connected in a positively locking manner to the camshaft. An adapter ring allows the rotor to be attached to camshafts of different design. Said adapter ring is preferably formed with a counterpart contour that can be connected to the contour of a rotor to be fastened. The adapter ring may for this purpose be pushed onto the end of the camshaft, preferably at an end side, and for example adhesively bonded or welded there. A modification of a camshaft to a rotor to be attached can thus be dispensed with, such that for example even already existing systems can be converted in a simple manner.

Further advantageous embodiments also emerge from the subclaims which are directed to the rotor, which embodiments can be transferred analogously to the camshaft adjusting system.

BRIEF DESCRIPTION OF THE DRAWING

Exemplary embodiments of the invention will be explained in more detail below on the basis of a drawing, in which:

FIG. 3 shows a detail of a camshaft adjusting system in a three-dimensional illustration, with the rotor as per FIG. 1 and the camshaft as per FIG. 2, FIG. 4 shows a detail view of a contour of the rotor as per FIG. 1 in a three-dimensional illustration, FIG. 9 shows the rotor as per FIG. 8 in a plan view, and FIG. 10 shows a longitudinal section through a camshaft adjusting system having a sealing element.

Figure 1:
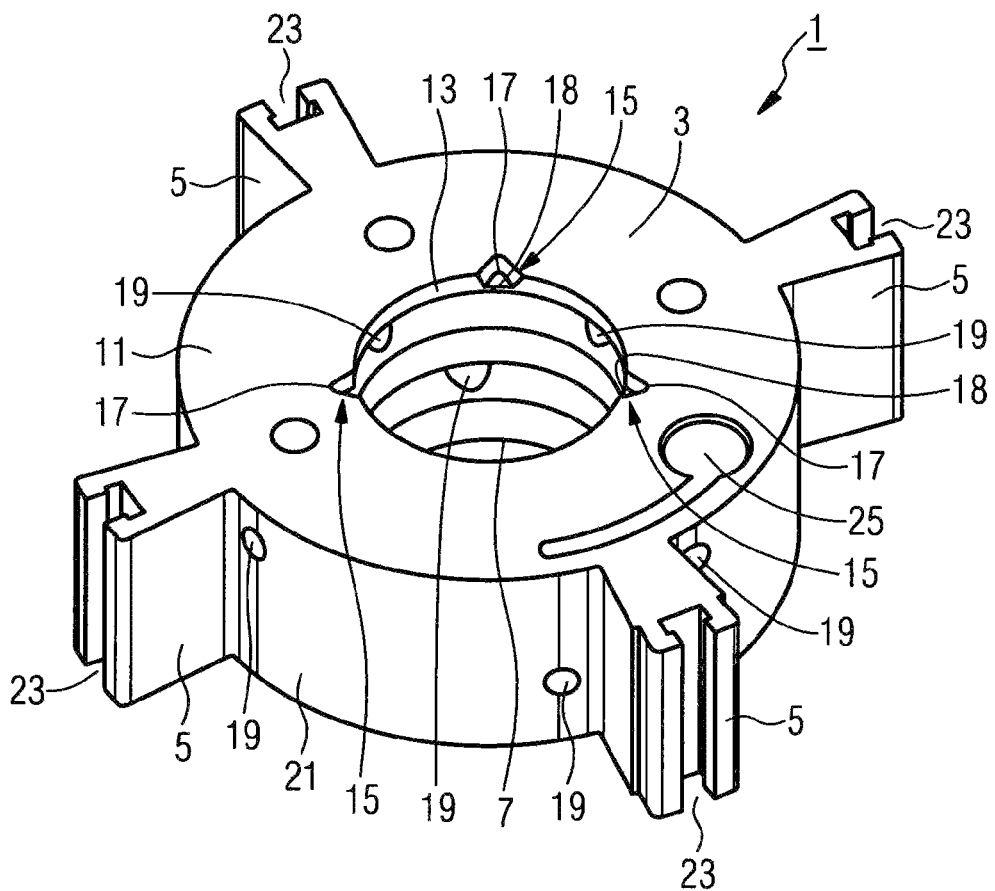
FIG. 1 shows a rotor with a contour on the inner circumference of its end surface in a three-dimensional illustration.

Below, identical components in the exemplary embodiments are denoted by the same reference signs.

DETAILED DESCRIPTION OF THE DRAWING

Figure 2:
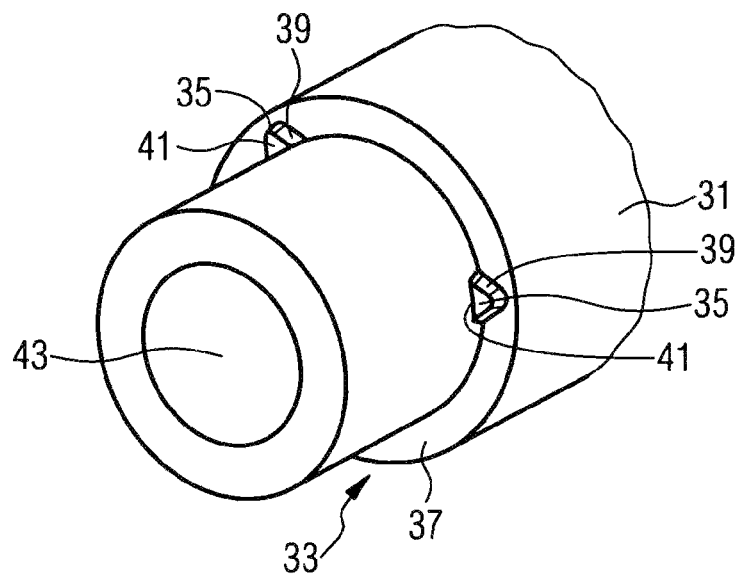
FIG. 2 shows the end side of a camshaft with a counterpart contour in a three-dimensional illustration.

FIG. 1 shows a three-dimensional illustration of a rotor 1. The rotor has a cylindrical rotor main body 3 and has radially outwardly extending rotor vanes 5 arranged on said rotor main body. In the center of the rotor main body 3 there is formed an opening 7 for a camshaft to extend through. A camshaft is shown in FIG. 2.

On its end surface 11, the rotor 1 has, on the inner circumference 13, an axially extending contour 15 for axial positively locking connection to a camshaft. The contour 15 is formed into the end surface 11 of the rotor 1 in the manner of three depressions on the inner circumference and is distributed asymmetrically over the inner circumference 13. The asymmetry of the contour 15 is correspondingly formed such that exactly one position for the axial connection of the rotor 1 to a camshaft is possible. This is realized by means of the varying angular intervals by which the depressions are spaced apart from one another.

By means of the contour 15, the rotor 1 can be centered axially in a positively locking manner on a camshaft with corresponding counterpart contour. Owing to the asymmetrical, that is to say rotationally non-symmetrical distribution of the contour over the end surface, one defined assembly position of the rotor 1 on a camshaft is predefined, such that incorrect assembly of the rotor 1 can be prevented.

The depressions 15 extend radially outward in the end surface 11 of the rotor main body 3. Said depressions have contact surfaces 17, which taper obliquely both with respect to the radial direction and also with respect to the axial direction, for self-centering of the rotor 1 on the camshaft. The contact surfaces 17 can be clearly seen in FIG. 4, and are described in corresponding detail there. The depressions 15 furthermore have in each case one support surface 18 which is formed in the main body and which can serve for the abutment of a counterpart contour on the camshaft.

Furthermore, the rotor 1 has a number of openings 19 both on its inner circumference 13 and on its outer circumference 21, which openings serve for the supply of hydraulic medium to the camshaft adjuster. The rotor vanes 5 are formed, on the vane ends thereof, with depressions 23 in which sealing elements for reducing the internal leakage within a camshaft adjuster can be mounted.

Furthermore, the rotor 1 is formed, in the main body 3 thereof, with a locking bore 25 which serves for the locking of the rotor 1 and a stator in the installed state within the camshaft adjuster.

FIG. 2 shows a camshaft 31 to which a rotor 1 as per FIG. 1 can be fastened. Here, for fastening, a counterpart contour 35 is provided on an end 33 of the camshaft 31, that is to say on the end side. Said counterpart contour 35 is formed in the manner of three elevations on an annular abutment surface 37 on the camshaft end 33, only two of which elevations are visible owing to the illustration. The elevations are, like the contour 15 of the rotor 1, distributed over the circumference of the camshaft 31. The asymmetry is realized by means of the varying angular intervals by which the elevations are spaced apart from one another. The elevations can, in the assembled state, engage into the contour 15 on the end side 11 of the rotor 1. Said embodiment permits exactly one position of the rotor 1 on the camshaft 31.

The elevations of the counterpart contour 35 likewise have, corresponding to the contour 15, contact surfaces 39 which taper obliquely with respect to the radial and axial directions. Furthermore, said elevations likewise have a support surface 41 which can abut against the support surface 18 of the contour 15. The camshaft end 33 is additionally formed with an opening 43 into which a central screw (not shown) can be inserted in order, together with the rotor 1, to fasten further camshaft adjustment components to the camshaft 31.

An assembled illustration 51 of the rotor 1 as per FIG. 1 on the camshaft 31 as per FIG. 2 is shown in FIG. 3. Here, the rotor 1 is centered with its contour 15 on the counterpart contour 35 of the camshaft 31. The camshaft end 33 is pushed through the opening 7 in the rotor 1 and abuts with its annular abutment surface 37 against the end surface 11 of the rotor. The elevations of the counterpart contour 35 engage into the depressions of the contour 15 and thus permit a positively locking connection of the two components. The rotor 1 is preferably screwed onto the camshaft 31 by means of a nut. Here, the nut preferably has an elastic region, for example in the manner of a plate spring, whereby losses in setting force can be adequately absorbed.

FIG. 4 shows the detail view of a contour 15, or of a depression of the contour 15, as per FIG. 1 in a three-dimensional illustration. The depression 15 is formed into the rotor main body 3 at the inner diameter 13. It is possible to clearly see the contact surfaces 17, which taper obliquely with respect to the radial and axial directions, of the depression 15. The contact surfaces 17 serve for the abutment of the contact surfaces of the counterpart contour of a camshaft in the assembled state. The contact surfaces 17 permit self-centering of the rotor 1 and a transmission of torque between a crankshaft and a camshaft in the assembled state. The support surface 18 serves for the abutment of the corresponding support surface 41 of the counterpart contour 35.

Figure 5:
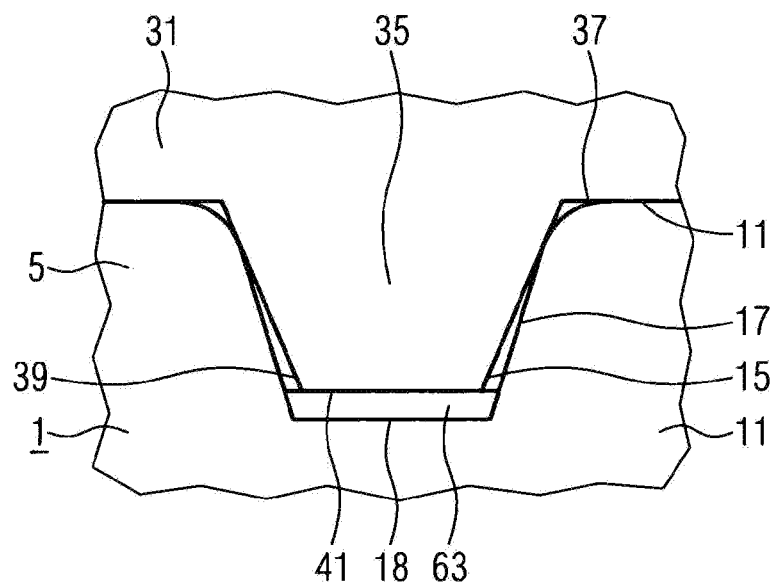
FIG. 5 shows a cross section through the plane of engagement of the counterpart contour of the camshaft as per FIG. 2 into the contour of the rotor as per FIG. 1.

FIG. 5 shows a cross section through the plane of engagement of a rotor 1 as per FIG. 1 and a camshaft 31 as per FIG. 2. The counterpart contour 35 of the camshaft 1 is positioned in a positively locking manner in the contour 15 of the rotor 1. The defined contact surfaces 17, 39 of the two components permit a play-free transmission of torque between the rotor 1 and the camshaft 31, and thus between the crankshaft and the camshaft 31. The space 63 formed between the support surfaces 18, 41 permits an axial expansion of the counterpart contour 35 in the event of the fastening of additional camshaft adjustment components by means of a central screw.

Figure 6:
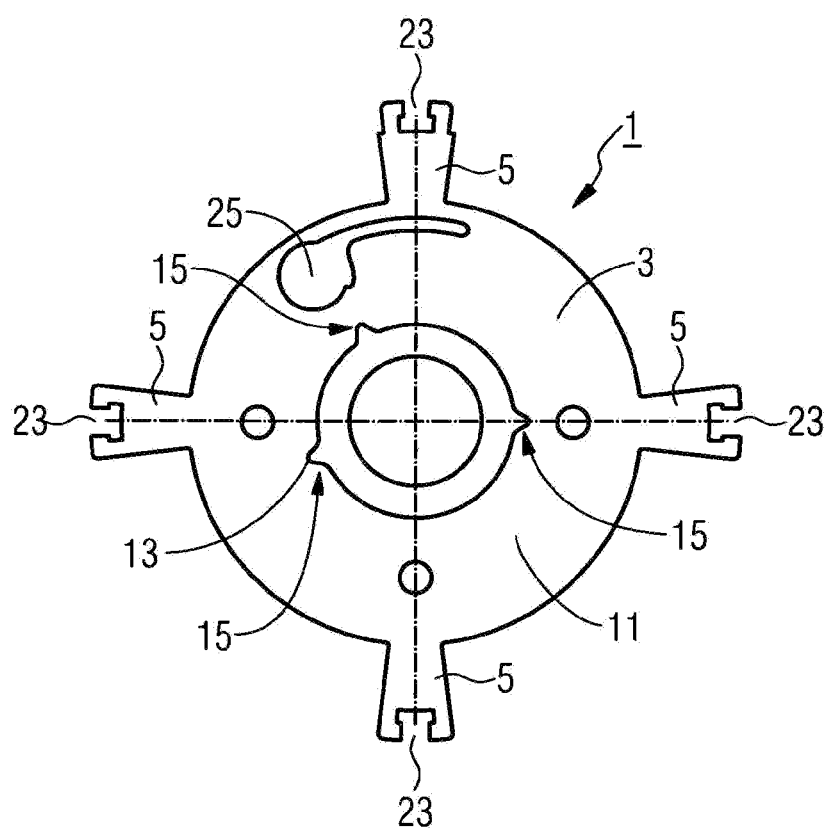
FIG. 6 shows a plan view of a rotor.

FIG. 6 shows a plan view of a rotor 1 as per FIG. 1, which particularly clearly illustrates the asymmetrical distribution of the depressions over the inner circumference 13 of the rotor main body 3. The depressions are distributed over the circumference 13 with varying angular intervals to one another. As a result of said asymmetrical, that is to say rotationally non-symmetrical arrangement, it can be ensured that assembly on a camshaft 31 can take place in only one position.

Figure 7:
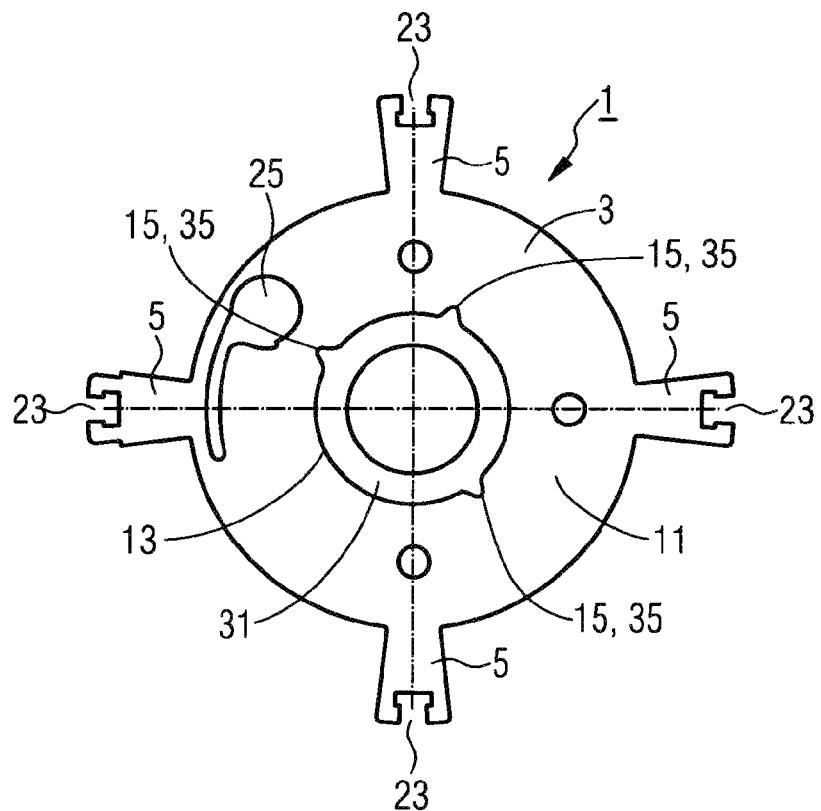
FIG. 7 shows a plan view of a camshaft adjusting system having the rotor as per FIG. 6 and a camshaft.

This can be seen from FIG. 7. Said figure shows a plan view, as in FIG. 6, of the rotor 1 which has already been connected, as part of a camshaft adjusting system, to the camshaft 31. It can be seen here that exactly one position of the camshaft 31 on the end side of the rotor 1 is possible. The elevations 35 on the end 33 of the camshaft 31 are positioned in the depressions of the contour 15 in the end surface 11 of the rotor, such that the rotor 1 is mounted axially on the camshaft 31 in a positively locking manner.

Figure 8:
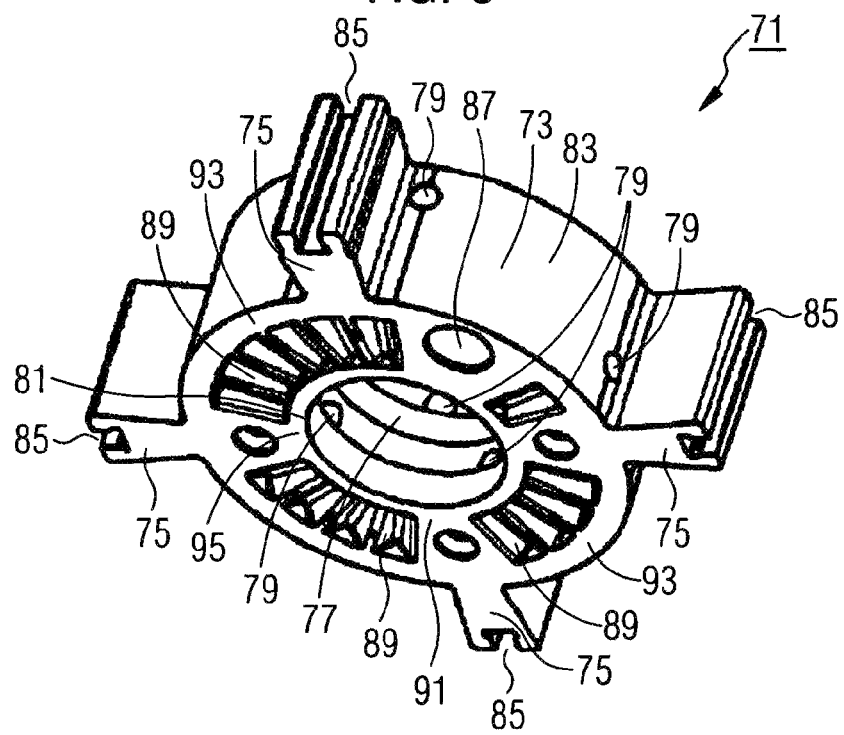
FIG. 8 shows a rotor in a three-dimensional illustration with an embedded contour.

FIG. 8 shows a further rotor 71 in a three-dimensional illustration, having a cylindrical rotor main body 73 and having radially outwardly extending rotor vanes 75 arranged on said rotor main body. In the center of the rotor main body 73 there is likewise formed an opening 77 for a camshaft to extend through. As in FIG. 1, the rotor 71 has a number of openings 79 which are formed both on its inner circumference 81 and on its outer circumference 83 and which serve for the supply of hydraulic medium.

The rotor vanes 75 likewise have depressions 85 on their vane ends, in which depressions sealing elements for reducing the internal leakage within a camshaft adjuster can be mounted. Furthermore, the rotor 71 has in its main body 73 a locking bore 87 for the locking of the rotor 71 and a stator in the installed state.

By contrast to FIG. 1, a contour 89 is formed in the end surface 91 of the rotor main body 73. The contour 89 is formed in the manner of a discontinuous Hirth toothing in the end surface 91. The Hirth toothing permits a precise connection of the rotor 71 to a camshaft, which is not shown in FIG. 8. It can however be clearly seen here that the toothing is not uniformly distributed over the entire circumference of the rotor 71. Centering of the rotor 91 on a camshaft, and thus fixing in its axial position, are possible in this way. As a result of the discontinuous form of the Hirth toothing, incorrect assembly can be prevented. In this way, the rotor can be oriented accurately in terms of angle with respect to the cams of the camshaft without ancillary elements.

The Hirth toothing is formed between annular surfaces 93, 95 embedded on the inner circumference 81 and on the outer circumference 83. The annular surfaces 93, 95 serve for the sealing of the oil flow in the assembled state in a camshaft adjuster. For this purpose, use may for example be made of sealing elements such as O rings which are inserted into or placed onto the annular surfaces 93, 95.

FIG. 9 shows a plan view of the rotor 71 as per FIG. 8. It is possible to clearly see the contour 89 which is formed as a discontinuous Hirth toothing and which is formed asymmetrically, with varying angular intervals, over the end surface 91. The contour 89 is embedded into the end surface 91 between the radially inner and radially outer encircling annular surfaces 93, 95. The rotor 71 is connected by means of the contour to a counterpart contour on the adapter 115 of the camshaft. The counterpart contour can be seen by way of indication in the longitudinal section of FIG. 10.

FIG. 10 shows a longitudinal section through a camshaft adjusting system 111 without the camshaft adjuster. The camshaft 112 is assembled from a camshaft tube 113 and an adapter 115 with a counterpart contour into which the contour of a rotor can engage. The counterpart contour of the adapter 115 is recessed on the inner diameter and forms an abutment surface 117 for a sealing element 119. The sealing element 119 serves, in the installed state between the end surface of a rotor and the abutment surface 117, to provide sealing against an external leakage of hydraulic fluid from the camshaft adjuster.

The invention claimed is:

1. A rotor for a camshaft adjuster, the rotor comprising a substantially annular rotor main body which has an end surface with a contour extending in an axial direction, wherein the contour is asymmetrical such that exactly one position for the axial connection of the rotor main body to a camshaft is predefined, wherein the contour is formed with a number of individual depressions which are distributed asymmetrically at varying angular intervals over the inner circumference of the rotor main body.

2. The rotor as claimed in claim 1, wherein the contour is formed with a number of individual depressions which are embedded asymmetrically at varying angular intervals in the end surface of the rotor main body.

3. The rotor as claimed in claim 1, wherein the depressions have contact surfaces which taper obliquely with respect to the radial and/or the axial direction.

4. The rotor as claimed in claim 1, wherein in the end surface of the rotor main body there is formed at least one annular surface, which encircles the contour, for the sealing of the camshaft adjuster.

5. The rotor as claimed in claim 1, wherein the contour is formed with a number of individual depressions in the manner of a discontinuous Hirth toothing.

6. A camshaft adjusting system for an internal combustion engine, the system comprising:
   a rotor as claimed in claim 1, and
   a camshaft, wherein the camshaft has, on its end side, a counterpart contour by which the contour of the rotor is connected in a positively locking manner to the camshaft.

7. The camshaft adjusting system as claimed in claim 6, wherein the counterpart contour of the camshaft has a number of axially extending individual elevations which engage into the depressions of the rotor.

8. The camshaft adjusting system as claimed in claim 6, wherein a sealing element is positioned in an annular surface which encircles the contour, which sealing element provides sealing with respect to the camshaft.

9. The camshaft adjusting system as claimed in claim 6, comprising an adapter by which the contour of the rotor is connected in a positively locking manner to the camshaft.

10. A rotor for a camshaft adjuster, the rotor comprising a substantially annular rotor main body which has an end surface with a contour extending in an axial direction, wherein the contour is asymmetrical such that exactly one position for the axial connection of the rotor main body to a camshaft is predefined, wherein in the end surface of the rotor main body there is formed at least one annular surface, which encircles the contour, for the sealing of the camshaft adjuster.

11. A camshaft adjusting system for an internal combustion engine, the system comprising:
   a rotor comprising a substantially annular rotor main body which has an end surface with a contour extending in an axial direction, wherein the contour is asymmetrical such that exactly one position for the axial connection of the rotor main body to a camshaft is predefined, and
   a camshaft having, on its end side, a counterpart contour by which the contour of the rotor is connected in a positively locking manner to the camshaft, wherein a sealing element is positioned in an annular surface which encircles the contour, which sealing element provides sealing with respect to the camshaft.

12. A rotor for a camshaft adjuster, the rotor comprising a substantially annular rotor main body which has an end surface with a contour extending in an axial direction, wherein the contour is asymmetrical such that exactly one position for the axial connection of the rotor main body to a camshaft is predefined, wherein the contour is formed with a number of individual depressions which are embedded asymmetrically at varying angular intervals in the end surface of the rotor main body.

13. The rotor as claimed in claim 12, wherein the depressions have contact surfaces which taper obliquely with respect to the radial and/or the axial direction.

* * * * *